(12) United States Patent
Gu et al.

(10) Patent No.: US 11,809,704 B2
(45) Date of Patent: Nov. 7, 2023

(54) CONTROL METHOD APPLIED TO SCREEN PROJECTION SCENARIO AND RELATED DEVICE

(71) Applicant: Honor Device Co., Ltd., Shenzhen (CN)

(72) Inventors: Hejin Gu, Shenzhen (CN); Siyue Niu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/638,567

(22) PCT Filed: Jul. 22, 2020

(86) PCT No.: PCT/CN2020/103440
§ 371 (c)(1),
(2) Date: Feb. 25, 2022

(87) PCT Pub. No.: WO2021/036594
PCT Pub. Date: Mar. 4, 2021

(65) Prior Publication Data
US 2022/0300153 A1   Sep. 22, 2022

(30) Foreign Application Priority Data
Aug. 29, 2019 (CN) .......................... 201910809113.9

(51) Int. Cl.
*G06F 3/14* (2006.01)
*G06F 3/0482* (2013.01)
(Continued)

(52) U.S. Cl.
CPC ........ *G06F 3/04886* (2013.01); *G06F 3/0482* (2013.01); *G06F 3/04847* (2013.01); *G06F 3/1454* (2013.01)

(58) Field of Classification Search
CPC .............. G06F 3/04886; G06F 3/0482; G06F 3/04847; G06F 3/1454; G06F 2203/0383;
(Continued)

(56) References Cited

U.S. PATENT DOCUMENTS 8,698,845 B2 * 4/2014 Lemay ................... G06F 3/041
345/169
8,806,369 B2 * 8/2014 Khoe .................. G06F 3/04883
715/764
(Continued)

FOREIGN PATENT DOCUMENTS

CN    103713847 A    4/2014
CN    104281408 A    1/2015
(Continued)

OTHER PUBLICATIONS

Tohru Kawakami et al.; "High-Resolution Multi-View Projection Display With a Quantized-Diffusion-Angle Screen" Journal of Display Technology, vol. 8, No. 9, Sep. 2012; 9 pages.
(Continued)

*Primary Examiner* — Jordany Nunez
(74) *Attorney, Agent, or Firm* — Rimon PC

(57) ABSTRACT

Provided is a control system applied to a screen projection scenario. The system includes: a mobile phone and a display device, receiving first screen content and a target navigation function identifier sent by the mobile phone; generating, according to the target navigation function identifier, a collaboration window including a screen projection area and a navigation bar, where the navigation bar includes three virtual navigation keys; displaying the first screen content in the screen projection area; receiving a keyboard and mouse operation acting on the virtual navigation keys; generating a key instruction according to the keyboard and mouse operation, and sending the key instruction to the mobile phone, so that the mobile phone executes a navigation function accord-
(Continued)

ing to the key instruction, and the mobile phone can adjust the first screen content to second screen content; and displaying, by the display device, the second screen content in the screen projection area.

19 Claims, 8 Drawing Sheets

(51) Int. Cl.
  *G06F 3/04847* (2022.01)
  *G06F 3/04886* (2022.01)
(58) Field of Classification Search
  CPC ............ G06F 3/023; G06F 3/038; G06F 2203/04803; G06F 3/0481; G06F 3/1423; H04M 1/72412; H04M 2250/16; G09G 2354/00; G09G 2370/04; G09G 2370/16; G09G 5/08; G09G 5/12; G09G 5/14; H04N 21/42204
  See application file for complete search history.

(56) References Cited

U.S. PATENT DOCUMENTS

| | | | |
|---|---|---|---|
| 9,164,649 B2* | 10/2015 | Dent | G06F 3/0481 |
| 9,207,838 B2* | 12/2015 | Khoe | G06F 3/0481 |
| 9,507,482 B2* | 11/2016 | Turner | G09G 5/026 |
| 9,513,793 B2* | 12/2016 | Johansson | G06F 3/1454 |
| 9,600,145 B2 | 3/2017 | Jeon et al. | |
| 9,619,128 B2* | 4/2017 | Edge | G06F 3/04847 |
| 9,628,570 B2 | 4/2017 | Park | |
| 9,760,331 B2* | 9/2017 | Lee | G06F 3/04845 |
| 9,924,018 B2* | 3/2018 | Won | G06F 3/1462 |
| 11,301,200 B2 | 4/2022 | Zhang et al. | |
| 2005/0091359 A1 | 4/2005 | Soin et al. | |
| 2007/0159464 A1* | 7/2007 | Seo | G06F 3/04815 345/167 |
| 2010/0082784 A1* | 4/2010 | Rosenblatt | H04L 67/10 709/222 |
| 2011/0164058 A1* | 7/2011 | Lemay | G06F 3/04883 345/173 |
| 2012/0054793 A1 | 3/2012 | Kang et al. | |
| 2012/0088548 A1* | 4/2012 | Yun | G08C 23/04 455/557 |
| 2012/0244876 A1 | 9/2012 | Park et al. | |
| 2012/0262494 A1* | 10/2012 | Choi | G06F 3/0481 345/619 |
| 2013/0151989 A1* | 6/2013 | Dent | G06F 16/20 715/780 |
| 2013/0162502 A1* | 6/2013 | Lee | H04N 21/4363 345/1.2 |
| 2013/0219303 A1* | 8/2013 | Eriksson | G06F 3/1454 715/759 |
| 2013/0222227 A1* | 8/2013 | Johansson | H04L 67/10 345/156 |
| 2014/0068520 A1* | 3/2014 | Missig | G09G 5/12 715/841 |
| 2014/0340332 A1* | 11/2014 | Lemay | G06F 3/0488 345/173 |
| 2015/0065056 A1* | 3/2015 | Won | H04M 1/72412 455/41.3 |
| 2015/0138213 A1* | 5/2015 | Turner | G09G 3/002 345/520 |
| 2015/0169182 A1* | 6/2015 | Khoe | G06F 3/0482 715/781 |
| 2015/0309578 A1 | 10/2015 | McCoy et al. | |
| 2015/0339090 A1* | 11/2015 | Lee | G06F 3/0488 345/173 |
| 2016/0110152 A1* | 4/2016 | Choi | G06F 3/04817 345/2.3 |
| 2017/0017458 A1 | 1/2017 | Matsunaga | |
| 2017/0068498 A1 | 3/2017 | Hashem et al. | |
| 2017/0075527 A1* | 3/2017 | Turner | G06F 3/04883 |
| 2019/0065030 A1 | 2/2019 | Kang et al. | |
| 2019/0079666 A1 | 3/2019 | Li | |
| 2022/0004287 A1 | 1/2022 | Wang et al. | |
| 2022/0300153 A1 | 9/2022 | Gu et al. | |

FOREIGN PATENT DOCUMENTS

| | | |
|---|---|---|
| CN | 104967886 A | 10/2015 |
| CN | 106155614 A | 11/2016 |
| CN | 106873846 A | 6/2017 |
| CN | 107682724 A | 2/2018 |
| CN | 107743220 A | 2/2018 |
| CN | 107870754 A | 4/2018 |
| CN | 108459836 A | 8/2018 |
| CN | 108595137 A | 9/2018 |
| CN | 108702414 A | 10/2018 |
| CN | 109218731 A | 1/2019 |
| CN | 109753256 A | 5/2019 |
| CN | 110673782 A | 1/2020 |
| JP | 2008123408 A | 5/2008 |
| KR | 20190021016 A | 3/2019 |
| RU | 2389067 C2 | 5/2010 |
| RU | 2619889 C2 | 5/2017 |
| WO | 2018120884 A1 | 7/2018 |
| WO | 2019001347 A1 | 1/2019 |

OTHER PUBLICATIONS

Min Zhou; "Screen-casting software is easy to implement mobile phone and computer inter-casting" Computer & Network; Dec. 31, 2017, including English translation, 4 total pages.

* cited by examiner

CONTROL METHOD APPLIED TO SCREEN PROJECTION SCENARIO AND RELATED DEVICE

This application is a national stage of International Application No. PCT/CN2020/103440, filed on Jul. 22, 2020, which claims priority to Chinese Patent Application No. 201910809113.9, filed on Aug. 29, 2019. Both of the aforementioned applications are hereby incorporated by reference in their entireties.

TECHNICAL FIELD

This application relates to the field of computer technologies, and in particular, to a control method applied to a screen projection scenario and a related device.

BACKGROUND

With the development of computer technologies, devices of different types (for example, devices using different operating systems) may perform screen projection to implement screen sharing.

Using a screen projection scenario of a mobile phone and a computer as an example, when the mobile phone is projected to the computer, the computer may present a collaboration window. Screen content of the mobile phone may be displayed in the collaboration window, that is, a mobile phone mirror is presented on the computer. A user may control the mobile phone by performing a keyboard and mouse operation in the collaboration window of the computer.

However, the mobile phone generally uses a touch screen as an input device, and the computer uses a keyboard and a mouse as input devices. Simulating a touch operation by using a mouse or a keyboard has disadvantages, thereby affecting user experience of controlling the mobile phone by using the computer.

SUMMARY

This application provides a control method applied to a screen projection scenario and a related device, to implement functions by using keyboard and mouse operations in the screen projection scenario so as to replace functions that are hard to simulate and implement by the keyboard and mouse operations, thereby improving operation experience of a user.

According to a first aspect, this application provides a control method applied to a screen projection scenario. The screen projection scenario may include a mobile phone and a display device. After the mobile phone and the display device establish a connection, the display device receives first screen content and a target navigation function identifier sent by the mobile phone; generates a collaboration window including a screen projection area and a navigation bar according to the target navigation function identifier, and displays the first screen content in the screen projection area; receives a keyboard and mouse operation acting on virtual navigation keys on the navigation bar; and generates a key instruction according to the keyboard and mouse operation, and sends the key instruction to the mobile phone, to cause the mobile phone to execute a navigation function according to the key instruction, where the mobile phone may adjust the first screen content to second screen content by means of the navigation function. The display device receives the second screen content sent by the mobile phone, and displays the second screen content in the screen projection area.

The first screen content refers to content displayed on a screen of the mobile phone when the mobile phone and the display device establish the connection. Target navigation functions include mobile phone navigation functions except a three-key navigation function. The navigation bar includes three virtual navigation keys, and the three virtual navigation keys respectively correspond to different navigation functions. For example, the three virtual navigation keys are respectively a menu key, a desktop key, and a return key, where the menu key is configured to enter a task menu, the desktop key is configured to return to a desktop, and the return key is configured to return to an upper level. It may be understood that, the functions shown above are common navigation functions. In an actual application, the functions of the three virtual navigation keys may be alternatively set to navigation functions of other types, which is not limited in this application.

In this application, if the mobile phone uses another navigation manner except a three-key navigation manner, the display device sets the navigation bar in the collaboration window, and a user may perform a system navigation function to the mobile phone by using the three virtual navigation keys in the navigation bar, to cause screen content of the mobile phone and content of the collaboration window to be updated synchronously, thereby reducing a problem that the user is prone to a mistaken touch when controlling the mobile phone in the another navigation manner, and improving experience when the user uses the display device to control the mobile phone.

In a possible implementation, a current navigation function includes a gesture navigation function and/or an out-of-screen physical navigation function, and the out-of-screen physical navigation function is implemented by using a physical key.

In another possible implementation, the method further includes: when a mode of the collaboration window is a maximized window mode and a pointer position is not located in a first target area, hiding the navigation bar, where the first target area is a part in an edge area of the screen projection area and corresponding to the navigation bar; and when the mode of the collaboration window is the maximized window mode and the pointer position is located in the first target area, displaying the navigation bar in the first target area.

In another possible implementation, the collaboration window further includes a title bar; when the mode of the collaboration window is the maximized window mode and the pointer position is not located in a second target area, hiding the title bar, where the second target area is a part in the edge area of the screen projection area and corresponding to the title bar; and when the mode of the collaboration window is the maximized window mode and the pointer position is located in the second target area, displaying the title bar in the second target area.

In another possible implementation, when the collaboration window is a portrait window, the navigation bar is located below or above the screen projection area, and the navigation bar is adjacent to the screen projection area; and when the collaboration window is a landscape window, the navigation bar is located on a right side or a left side of the screen projection area, and the navigation bar is adjacent to the screen projection area.

In another possible implementation, the method further includes: forbidding the keyboard and mouse operation from simulating the navigation function corresponding to the target navigation function identifier in the collaboration window.

According to a second aspect, this application provides a control method applied to a screen projection scenario. The method includes the following steps: sending first screen content and a target navigation function identifier to a display device; receiving a key instruction sent by the display device; executing a navigation function corresponding to the key instruction according to a preset correspondence, where the navigation function is used for adjusting the first screen content to second screen content; and sending the second screen content to the display device by a mobile phone, to cause the display device to display the second screen content in a screen projection area of a collaboration window.

The key instruction is generated by the display device according to a keyboard and mouse operation. The target navigation function identifier is used for identifying a current navigation function except a three-key navigation function on the mobile phone. In a possible implementation, the current navigation function includes a gesture navigation function and/or an out-of-screen physical navigation function, and the out-of-screen physical navigation function is implemented by using a physical key.

According to a third aspect, this application provides a display apparatus whose function may implement the control method according to the first aspect or any implementation. The function may be implemented by using hardware, or may be implemented by hardware executing corresponding software. The hardware or software includes one or more modules corresponding to the above function.

According to a fourth aspect, this application provides a mobile phone whose function may implement the control method according to the second aspect or any implementation. The function may be implemented by using hardware, or may be implemented by hardware executing corresponding software. The hardware or software includes one or more modules corresponding to the above function.

According to a fifth aspect, this application provides a screen projection system. The screen projection system includes the display device according to the third aspect or any implementation thereof and the mobile phone according to the fourth aspect or any implementation thereof.

According to a sixth aspect, this application provides a computer-readable storage medium, storing instructions, the instructions, when run on a computer, causing the computer to perform the method according to the first aspect or the second aspect.

According to a seventh aspect, this application provides a computer program product, the computer program product, when run on a computer, causing the computer to perform the method according to the first aspect or the second aspect.

DESCRIPTION OF EMBODIMENTS

This application relates to a control method applied to a screen projection scenario.

Figure 1:
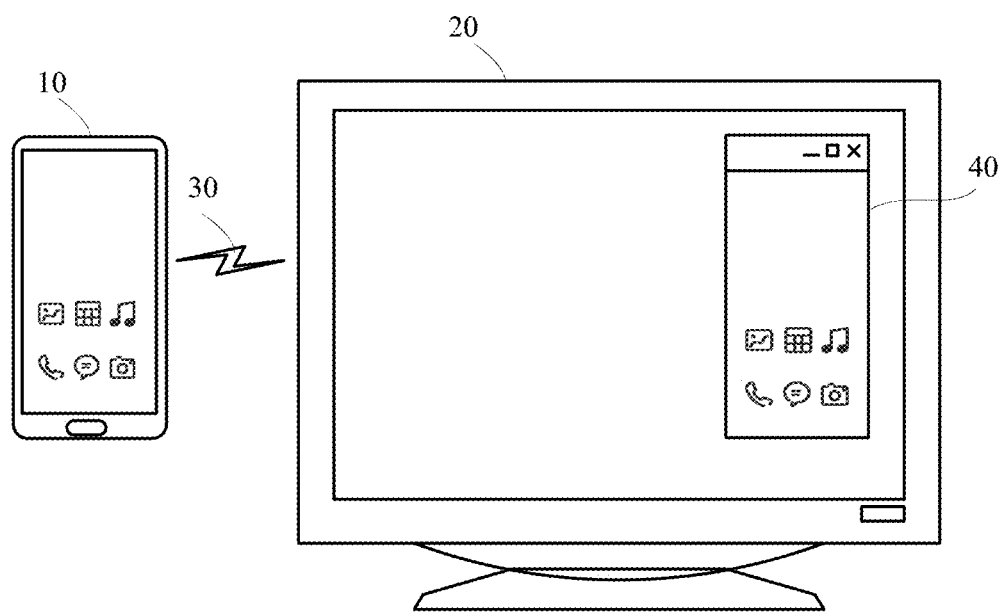
FIG. 1 is a schematic diagram of a screen projection scenario according to this application.

FIG. 1 is a schematic diagram of a screen projection scenario. The screen projection scenario includes a mobile phone 10 and a display device 20. The mobile phone 10 and the display device 20 may be connected to each other through a radio link 30. The mobile phone 10 and the display device 20 may be alternatively connected in a wired manner such as a data cable. After the mobile phone 10 and the display device 20 establish a connection, the display device 20 may generate a collaboration window 40 according to content displayed by a screen of the mobile phone 10. An operation of a user in the collaboration window 40 may update screen content of the mobile phone 10 and content of the collaboration window 40 synchronously.

The display device 20 refers to a computing device that performs an input operation by using a keyboard and/or a mouse and that has a display, such as a desktop computer or a notebook computer. The mobile phone 10 is also referred to as a cell phone. A system navigation function on the mobile phone is also referred to as a system navigation manner. The system navigation function includes gesture navigation, out-of-screen physical navigation, three-key navigation, and the like.

Using the display device 20 being a computer as an example, after the mobile phone 10 is projected to the computer, if the gesture navigation is used on the mobile phone 10, the user can hardly simulate a mobile phone navigation operation on the computer through a keyboard and mouse operation accurately. For example, a desktop is returned when sliding upward from a lower left end of the screen of the mobile phone. A task menu is entered when sliding upward from the lower left end of the screen of the mobile phone and holding for a period of time. An upper level is returned when sliding rightward from the leftmost side of the screen of the mobile phone. In this way, the user may easily start a navigation function mistakenly when using a keyboard and mouse operation to move on the computer. For example, when the user intends to enter the task menu, a function of returning to the desktop is started mistakenly when a pointer of the mouse is slid upward from a lower left end of the collaboration window.

Alternatively, if the out-of-screen physical navigation is used on the mobile phone 10, pressing a physical key once represents returning to the upper level, and pressing the physical key twice quickly represents returning to the desktop. A mistaken touch is easily triggered by a keyboard and mouse operation on the computer. For example, when the user intends to start the function of returning to the desktop, the navigation function of returning to the upper level is started by three clicks.

As can be seen from the above, if the mobile phone uses the gesture navigation or the out-of-screen physical navigation, the user may easily trigger a mistaken touch when simulating the above navigation manner by using a keyboard and mouse operation, so that the mobile phone cannot be controlled accurately to perform system navigation, thereby leading to poor operation experience of the user.

For the problems existing in the foregoing scenario, this application provides three virtual navigation keys on the computer to replace gesture navigation operations. In this way, performing keyboard and mouse operations on the three virtual navigation keys of the navigation bar can reduce a case that another navigation function is mistakenly touched and has better accuracy, thereby improving the operation experience of the user to control the mobile phone by using another device.

Figure 2:
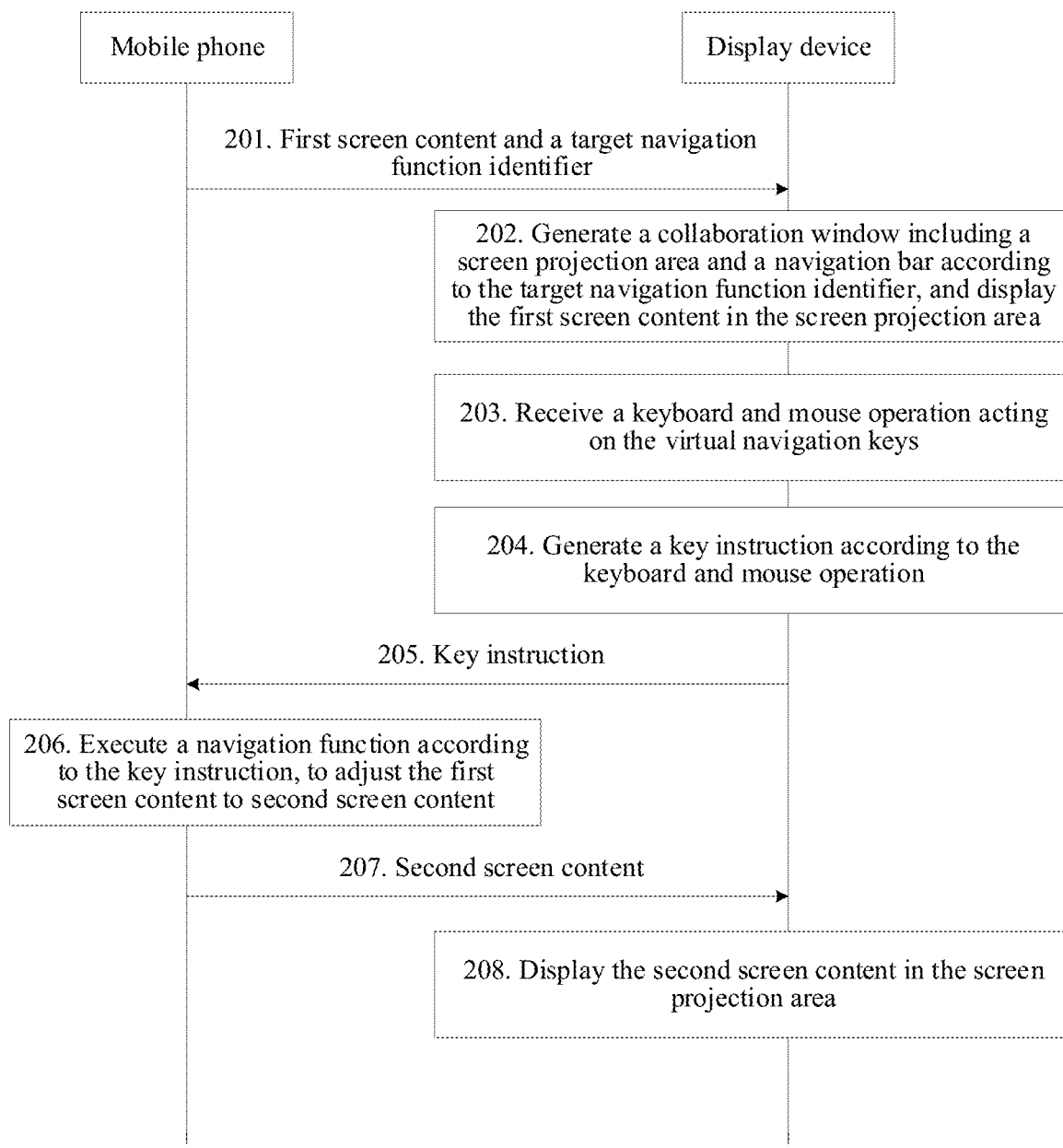
FIG. 2 is a signaling interaction diagram of a control method applied to a screen projection scenario according to this application.

The following describes the foregoing control method in a screen projection scenario. Referring to FIG. 2, an embodiment of a control method provided in this application includes the following steps:

Step 201. A display device receives first screen content and a target navigation function identifier sent by a mobile phone.

In this embodiment, the mobile phone may send a target navigation function identifier to the display device. The target navigation function identifier is used for identifying a current navigation function except a three-key navigation function. Specifically, the target navigation function identifier may be a character string or a numerical number used for identifying the current navigation function. In an actual application, the target navigation function identifier may be alternatively represented in another manner, such as a picture, a symbol, or text. When the mobile phone sends the target navigation function identifier, the target navigation function identifier may be carried in a message.

The current navigation function includes, but is not limited to, a gesture navigation function and/or an out-of-screen physical navigation function, and the out-of-screen physical navigation function is implemented by using a physical key. The three-key navigation function refers to an in-screen three-key navigation function or an out-of-screen three-key navigation function.

Optionally, the display device sends a query instruction to the mobile phone, and the mobile phone obtains the target navigation function identifier according to the query instruction and then sends the target navigation function identifier to the display device.

It should be noted that, the display device may receive the first screen content and the target navigation function identifier sent by the mobile phone at the same moment or at different moments.

Step 202. The display device generates a collaboration window including a screen projection area and a navigation bar according to the target navigation function identifier, and displays the first screen content in the screen projection area.

When the display device receives the target navigation function identifier sent by the mobile phone, the display device may determine that the current navigation function corresponding to the target navigation function identifier is not the three-key navigation function. That is, it indicates that simulating a navigation function that is currently used on the mobile phone on the computer by using a keyboard and mouse operation may trigger a mistaken touch. Optionally, the mobile phone may send service states of all navigation functions to the display device, and the display device may also determine the navigation function that is currently used on the mobile phone according to the service states of the navigation functions.

The screen projection area is used for displaying according to screen content of the mobile phone.

The navigation bar includes three virtual navigation keys. The three virtual navigation keys respectively correspond to different navigation functions. For example, the three virtual navigation keys are respectively a menu key, a desktop key, and a return key. The menu key is configured to enter a task menu, the desktop key is configured to return to a desktop, and the return key is configured to return to an upper level. It may be understood that, the functions shown above are common navigation functions. In an actual application, the functions of the three virtual navigation keys may be alternatively set to navigation functions of other types, which is not limited in this application.

It should be noted that, the display device may configure the screen projection area and the navigation bar in the collaboration window at the same moment or at different moments. For example, when the display device receives the first screen content sent by the mobile phone, the display device generates the screen projection area in the collaboration window. When the display device receives the target navigation function identifier, the display device generates the navigation bar in the collaboration window.

Step 203. The display device receives a keyboard and mouse operation acting on virtual navigation keys.

The keyboard and mouse operation refers to an operation inputted by using a keyboard and/or an operation inputted by using a mouse. For example, when a pointer of the mouse selects a virtual key, the virtual navigation key is clicked. The keyboard and mouse operation is not limited to the foregoing example.

Step 204. The display device generates a key instruction according to the keyboard and mouse operation.

When a keyboard and mouse operation is performed on a virtual navigation key, the display device may generate a key instruction corresponding to the virtual navigation key. For example, if the virtual navigation key is the menu key, a key instruction corresponding to the menu key is generated. If the virtual navigation key is the desktop key, a key instruction corresponding to the desktop key is generated. If the virtual navigation key is the return key, a key instruction corresponding to the return key is generated.

Step 205. The display device sends the key instruction to the mobile phone.

Step 206. The mobile phone executes a navigation function corresponding to the key instruction according to a preset correspondence, to adjust the first screen content to second screen content.

The preset correspondence refers to a correspondence between key instructions from the display device and navigation functions of the mobile phone. When the key instruction corresponds to the menu key, the navigation function performed on the mobile phone is to enter the task menu. When the key instruction corresponds to the desktop key, the navigation function performed on the mobile phone is to return to the desktop. When the key instruction corresponds to the return key, the navigation function performed on the mobile phone is to return to the upper level. It may be understood that, functions of the virtual navigation keys on the computer and system navigation functions of the mobile phone are in a one-to-one correspondence.

Step 207. The display device receives the second screen content sent by the mobile phone.

Step 208. The display device displays the second screen content in the screen projection area.

In this embodiment, if the mobile phone uses another navigation function except a three-key navigation function, the display device sets the navigation bar in the collaboration window, and a user performs a system navigation function to the mobile phone by using the three virtual navigation keys in the navigation bar, to cause screen content of the mobile phone and content of the collaboration window to be updated synchronously, thereby reducing a problem that the user is prone to a mistaken touch when controlling the mobile phone in the another navigation manner, and improving experience when the user uses the display device to control the mobile phone.

Figure 3A:
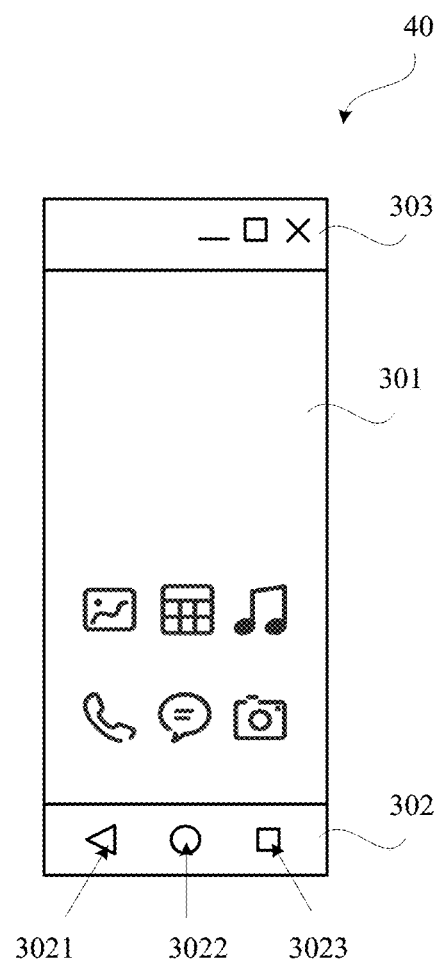
FIG. 3A is a schematic diagram of a collaboration window according to this application.

Referring to FIG. 3A, the collaboration window 40 of this application may include a screen projection area 301, a navigation bar 302, and a title bar 303. The navigation bar 302 and the title bar 303 may be hidden according to actual requirements.

The navigation bar 302 includes three virtual navigation keys, which are respectively a first virtual navigation key 3021, a second virtual navigation key 3022, and a third virtual navigation key 3023. Optionally, the first virtual navigation key 3021, the second virtual navigation key 3022, and the third virtual navigation key 3023 are respectively a return key, a desktop key, and a menu key. Functions of the virtual navigation keys and a sequence of the virtual navigation keys may be adjusted according to actual requirements.

The navigation bar 302 may be disposed outside the screen projection area 301 or may be disposed in the screen projection area 301. Optionally, when the collaboration window 40 is a maximized window, the navigation bar 302 is disposed in the screen projection area 301; and when the collaboration window 40 is not a maximized window, the navigation bar 302 is disposed outside the screen projection area 301.

The title bar 303 includes a minimized window key, a maximized window key, and a close window key. In addition, the title bar 303 may further include a window name, a direction locking key, and the like, which is not limited herein.

The following describes a case that the collaboration window 40 is a maximized window and the navigation bar 302 is disposed in the screen projection area 301:

In another optional embodiment, when a mode of the collaboration window 40 is the maximized window mode and a pointer position is not located in a first target area, the navigation bar 302 is hidden, where the first target area is a part in an edge area of the screen projection area 301 and corresponding to the navigation bar 302; and when the mode of the collaboration window 40 is the maximized window mode and the pointer position is located in the first target area, the navigation bar 302 is displayed in the first target area.

Specifically, the first target area may be one or a combination of an upper edge area, a lower edge area, a left edge area, or a right edge area of the screen projection area 301, or may be a part of any edge area above, which is not limited in this application.

Figure 3B:
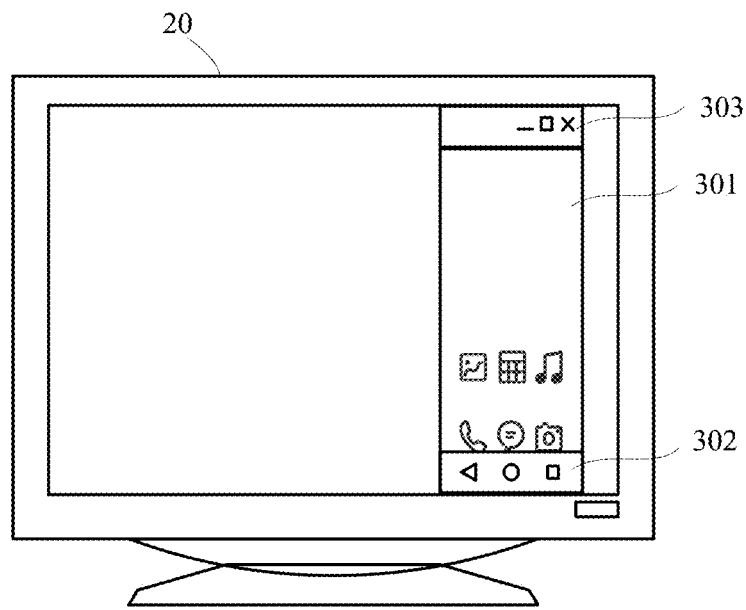
FIG. 3B is a schematic diagram of a collaboration window being a maximized portrait window according to this application.

Referring to FIG. 3B, in one case, the collaboration window 40 is a maximized portrait window, and the first target area is a lower edge of the screen projection area 301.

When the pointer is located at the lower edge of the screen projection area 301, the navigation bar 302 is displayed at the lower edge of the screen projection area 301. When the pointer is not located at the lower edge of the screen projection area 301, the navigation bar 302 is hidden. A manner for hiding the navigation bar 302 may be, but is not limited to: the navigation bar 302 moves downward from the lower edge of the screen projection area 301 and disappears, or the navigation bar 302 directly disappears.

Figure 3C:
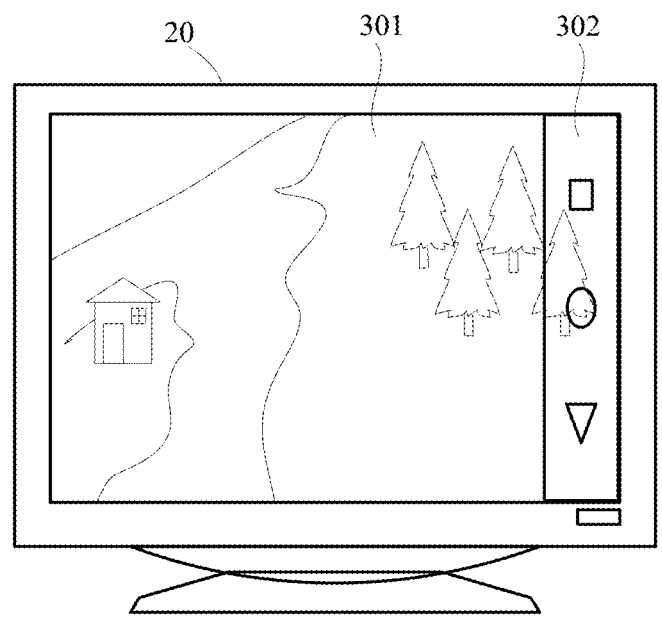
FIG. 3C is a schematic diagram of a collaboration window being a maximized landscape window according to this application.

Referring to FIG. 3C, in another case, the collaboration window 40 is a maximized landscape window, and the first target area is a right edge of the screen projection area 301. If the collaboration window 40 is the maximized landscape window, the screen projection area 301 may be a full-screen area. When the pointer is located at the right edge of the screen projection area 301, the navigation bar 302 is displayed at the right edge of the screen projection area 301. When the pointer is not located at the right edge of the screen projection area 301, the navigation bar 302 is hidden. A manner for hiding the navigation bar 302 may be, but is not limited to: the navigation bar 302 moves rightward from the right edge of the screen projection area 301 and disappears, or the navigation bar 302 directly disappears.

When the navigation bar 302 is displayed in the first target area in the screen projection area 301, the navigation bar 302 may block some displayed content of the screen projection area 301. The background of the navigation bar 302 may be set to transparent, to reduce blocking on the screen projection area 301.

When the mode of the collaboration window 40 is the maximized window mode and the pointer position is not located in the first target area, screen content of the mobile phone may be displayed in a full-screen manner by hiding the navigation bar 302. In this way, a manner for displaying the screen content of the mobile phone in a full-screen manner on the computer is provided, thereby improving user experience when watching a projected screen. In addition, a navigation bar that can be hidden or unfolded is provided. When the user intends to perform system navigation, the navigation bar may be invoked quickly, thereby providing convenient and quick access.

Figure 3D:
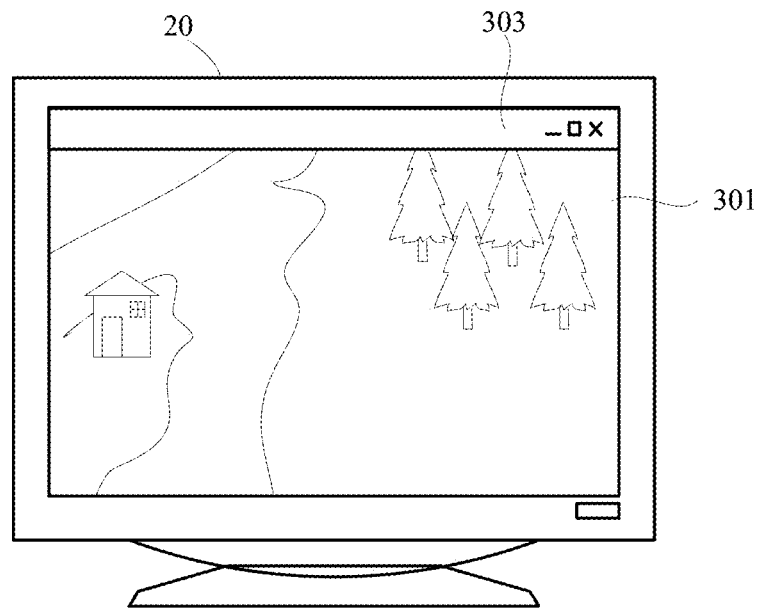
FIG. 3D is another schematic diagram of a collaboration window being a maximized landscape window according to this application.

Referring to FIG. 3D, in another optional embodiment, the foregoing method further includes: when the mode of the collaboration window 40 is the maximized window mode and the pointer position is not located in a second target area, hiding the title bar 303, where the second target area is a part in an edge area of the screen projection area 301 and corresponding to the title bar 303; and when the mode of the collaboration window 40 is the maximized window mode and the pointer position is located in the second target area, displaying the title bar 303 in the second target area.

In this embodiment, the collaboration window 40 further includes the title bar 303. In one case, the collaboration window 40 is a maximized portrait window. In another case, the collaboration window 40 is a maximized landscape window, and the screen projection area 301 is a full-screen area in this case. Specifically, the second target area may be one or a combination of an upper edge area, a lower edge area, a left edge area, or a right edge area of the screen projection area 301, or may be a part of any edge area above, which is not limited in this application. It may be understood that, the second target area and the first target area are generally set to two separate areas.

When the mode of the collaboration window 40 is the maximized window mode and the pointer position is not located in the second target area, screen content of the mobile phone may be displayed in a full-screen manner by hiding the title bar 303. In this way, a manner for displaying the screen content of the mobile phone in a full-screen manner on the computer is provided, thereby improving user experience when watching a projected screen. When the user intends to view the title bar 303 or adjust the collaboration window 40, the title bar 303 may be invoked quickly, thereby providing convenient and quick access.

Figure 3E:
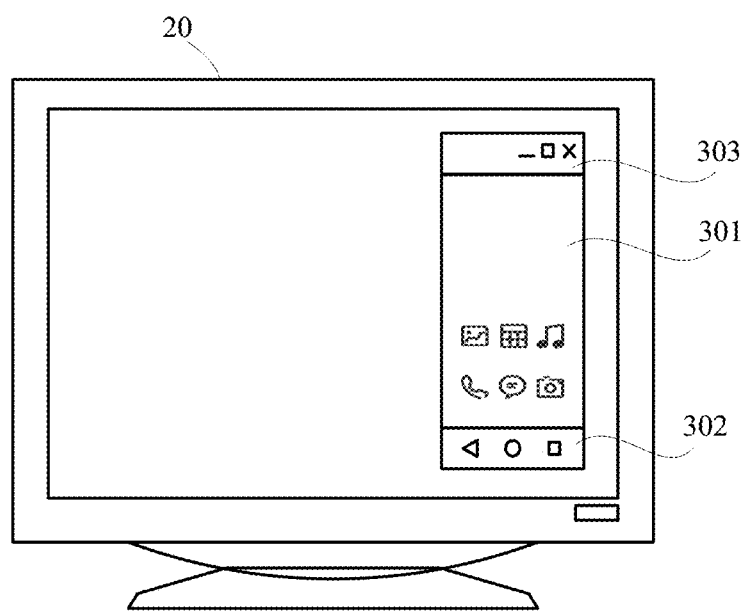
FIG. 3E is another schematic diagram of a collaboration window according to this application.

The following describes a case that the navigation bar 302 is disposed outside the screen projection area 301:

Referring to FIG. 3E, in another optional embodiment, when the collaboration window 40 is a portrait window, the navigation bar 302 is located below the screen projection area 301, and the navigation bar 302 is adjacent to the screen projection area 301. Such settings meet a habit that the user uses a three-key navigation function in a portrait mode, thereby improving user experience. When the collaboration window 40 is a portrait window, the navigation bar 302 may be alternatively disposed at another orientation of the screen projection area 301, such as the above of the screen projection area 301.

Figure 3F:
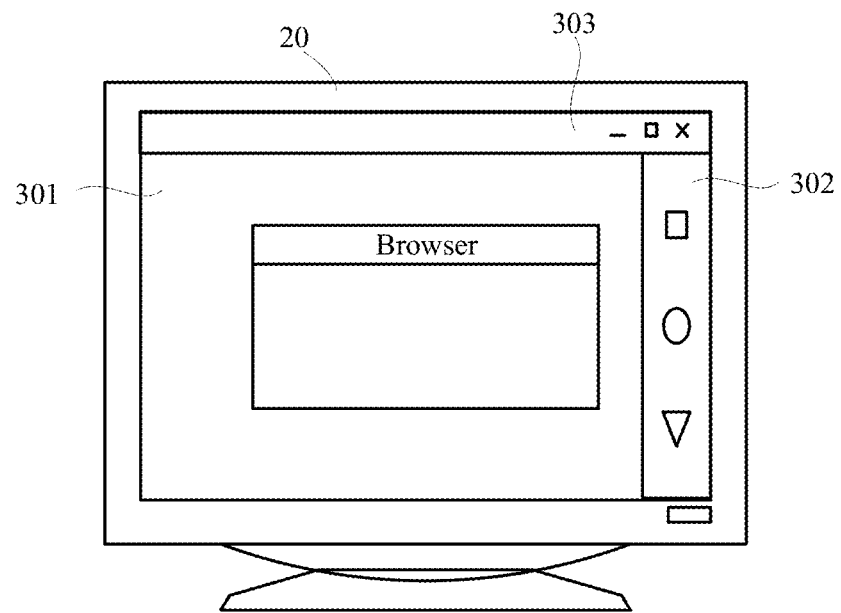
FIG. 3F is another schematic diagram of a collaboration window according to this application.

Referring to FIG. 3F, in another optional embodiment, when the collaboration window 40 is a landscape window, the navigation bar 302 is located on a right side of the screen projection area 301, and the navigation bar 302 is adjacent to the screen projection area 301. Such settings meet a habit that the user uses a three-key navigation function in a landscape mode, thereby improving user experience. When the collaboration window 40 is a landscape window, the navigation bar 302 may be alternatively disposed at another orientation of the screen projection area 301, such as a left side of the screen projection area 301.

It should be noted that, when a scale operation is performed on the collaboration window 40, the display device may scale the screen projection area 301 and the navigation bar 302 at the same ratio according to the scale operation.

In the collaboration window 40 of this application, the display device may start multiple navigation functions at the same moment, or may only start one navigation function and forbid other navigation functions.

In an optional embodiment, each navigation function in the collaboration window may be implemented through multiple types of keyboard and mouse operations.

For example, a navigation function of returning to a desktop is implemented through two keyboard and mouse operations. One keyboard and mouse operation is to click a desktop key, where the desktop key is a virtual navigation key. Another keyboard and mouse operation is to slide upward from a lower left end of the collaboration window. The rest may be deduced by analogy, and keyboard and mouse operations used for implementing other navigation functions may be set according to actual situations.

When the display device starts multiple navigation functions, the user may select keyboard and mouse operations to implement the navigation functions according to requirements, thereby providing implementation flexibility.

In another optional embodiment, the foregoing method further includes: forbidding the keyboard and mouse operation from simulating the navigation function corresponding to the target navigation function identifier in the collaboration window.

In this embodiment, when the mobile phone uses gesture navigation or out-of-screen physical navigation, the display device may forbid a keyboard and mouse operation from simulating the foregoing navigation function in the collaboration window. The display device only provides a three-key navigation function, so that a mistaken touch caused by using a keyboard and mouse operation to simulate the gesture navigation or out-of-screen physical navigation may be avoided in the collaboration window.

In another optional embodiment, the foregoing method further includes: sending, by the display device, a navigation function modification instruction to the mobile phone according to the target navigation function identifier, and modifying, by the mobile phone, the current navigation function to an in-screen three-key navigation function according to the navigation function modification instruction. In this embodiment, if the mobile phone uses another navigation function, the navigation function of the mobile phone is modified to the in-screen three-key navigation function. During screen projection, an in-screen three-key navigation bar is displayed both on the mobile phone and the display device, and the mobile phone may be controlled through the in-screen three-key navigation bar on the display device.

It should be noted that, in addition to a mobile phone, the foregoing control method may be further applied to another electronic device that uses gesture navigation or out-of-screen physical navigation.

Figure 4:
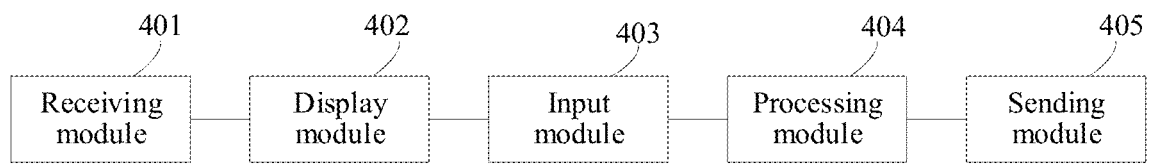
FIG. 4 is a schematic structural diagram of a display device according to this application.

The control method of this application is described above, and the following describes a related apparatus configured to implement the foregoing control method of this application. Referring to FIG. 4, an embodiment of a display apparatus provided in this application includes:

a receiving module 401, configured to receive first screen content and a target navigation function identifier sent by a mobile phone, where the target navigation function identifier is used for identifying a current navigation function except a three-key navigation function on the mobile phone;

a display module 402, configured to generate a collaboration window including a screen projection area and a navigation bar according to the target navigation function identifier, where the navigation bar includes three virtual navigation keys; and display the first screen content in the screen projection area;

an input module 403, configured to receive a keyboard and mouse operation acting on the virtual navigation keys;

a processing module 404, configured to generate a key instruction according to the keyboard and mouse operation;

a sending module 405, configured to send the key instruction to the mobile phone, to cause the mobile phone to execute a navigation function according to the key instruction, where the navigation function is used for adjusting the first screen content to second screen content;

the receiving module 401 being further configured to receive the second screen content sent by the mobile phone; and the display module 402 being further configured to display the second screen content in the collaboration window.

In an optional embodiment, the current navigation function includes a gesture navigation function and/or an out-of-screen physical navigation function, and the out-of-screen physical navigation function is implemented by using a physical key.

In another optional embodiment, the display module 402 is further configured to: when a mode of the collaboration window is a maximized window mode and a pointer position is not located in a first target area, hide the navigation bar, where the first target area is a part in an edge area of the screen projection area and corresponding to the navigation bar; and when the mode of the collaboration window is the maximized window mode and the pointer position is located in the first target area, display the navigation bar in the first target area.

In another optional embodiment, the collaboration window further includes a title bar; and the display module 402 is further configured to: when the mode of the collaboration window is the maximized window mode and the pointer position is not located in a second target area, hide the title bar, where the second target area is a part in the edge area of the screen projection area and corresponding to the title bar; and when the mode of the collaboration window is the maximized window mode and the pointer position is located in the second target area, display the title bar in the second target area.

In another optional embodiment, the processing module 404 is further configured to forbid the keyboard and mouse operation from simulating the navigation function corresponding to the target navigation function identifier in the collaboration window.

Figure 5:
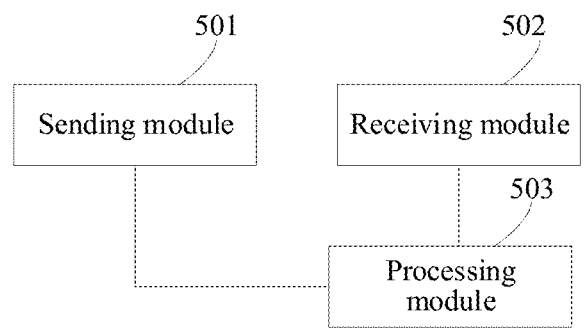
FIG. 5 is a schematic structural diagram of a mobile phone according to this application.

Referring to FIG. 5, an embodiment of a mobile phone provided in this application includes:

a sending module 501, configured to send first screen content and a target navigation function identifier to a display device, where the target navigation function identifier is used for identifying a current navigation function except a three-key navigation function on the mobile phone;

a receiving module 502, configured to receive a key instruction sent by the display device, where the key instruction is generated by the display device according to a keyboard and mouse operation;

a processing module 503, configured to execute a navigation function corresponding to the key instruction according to a preset correspondence, where the navigation function is used for adjusting the first screen content to second screen content; and the sending module 501 being further configured to send the second screen content to the display device, to cause the display device to display the second screen content in a screen projection area of a collaboration window.

In an optional embodiment, the current navigation function includes a gesture navigation function and/or an out-of-screen physical navigation function, and the out-of-screen physical navigation function is implemented by using a physical key.

Figure 6:
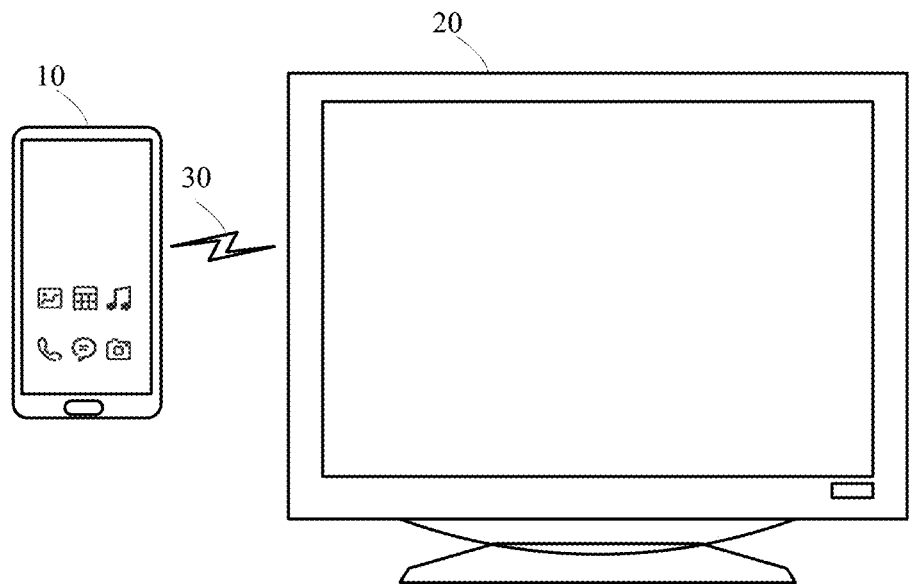
FIG. 6 is a schematic diagram of a screen projection system according to this application.

Referring to FIG. 6, an embodiment of a screen projection system provided in this application includes:

a display device 20 and a mobile phone 10, where the mobile phone 10 and the display device 20 are connected to each other through a radio link 30;

the display device 20 is configured to: receive first screen content and a state of a target navigation function sent by the mobile phone 10, where the target navigation function includes mobile phone navigation functions except a three-key navigation function; generate a collaboration window including a screen projection area and a navigation bar when the state of the target navigation function is a started state, and display the first screen content in the screen projection area, where the navigation bar includes three virtual navigation keys; receive a keyboard and mouse operation acting on the virtual navigation keys; generate a key instruction according to the keyboard and mouse operation and send the key instruction to the mobile phone to cause the mobile phone to execute a navigation function according to the key instruction; receive second screen content sent by the mobile phone; and display the second screen content in the screen projection area; and the mobile phone 10 is configured to: send first screen content and a state of a target navigation function to the display device 20; receive a key instruction sent by the display device when the state of the target navigation function is a started state; execute a navigation function according to the key instruction, where the navigation function is used for adjusting the first screen content to second screen content; and send the second screen content to the display device.

Specifically, the radio link may be a wireless fidelity (wireless fidelity, WiFi) link or a Bluetooth link. Functions of the display device 20 may be the same as that of the display device in the embodiment shown in FIG. 4 or other optional embodiments. Functions of the mobile phone 10 may be the same as that of the mobile phone in the embodiment shown in FIG. 5 or other optional embodiments.

Figure 7:
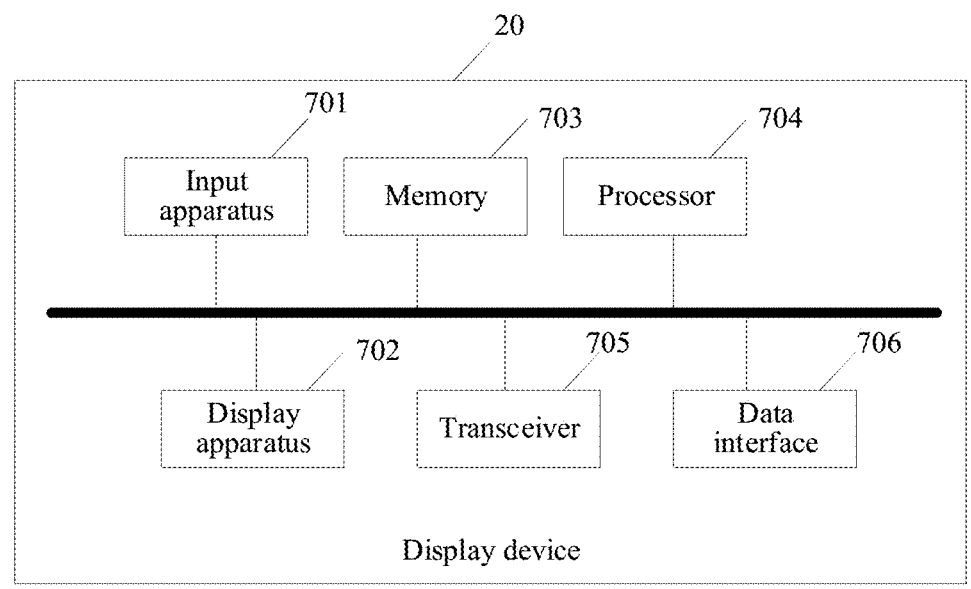
FIG. 7 is another schematic structural diagram of a display device according to this application.

Referring to FIG. 7, another embodiment of a display device 20 provided in this application includes:

an input apparatus 701, a display apparatus 702, a memory 703, a processor 704, a transceiver 705, and a data interface 706, where the input apparatus 701, the display apparatus 702, the memory 703, the processor 704, the transceiver 705, and the data interface 706 may be connected through a bus.

The input apparatus 701 may be a keyboard or a mouse.

The display apparatus 702 may be a display, a projector, or another device for display.

The memory 703 may be a volatile memory or a non-volatile memory, or may include a volatile memory and a non-volatile memory. The non-volatile memory may be a read-only memory (read-only memory, ROM), a programmable ROM (programmable ROM, PROM), an erasable PROM (erasable PROM, EPROM), an electrically EPROM (electrically EPROM, EEPROM), or a flash memory. The volatile memory may be a random access memory (random access memory, RAM), and is used as an external cache. It should be noted that, the memory described herein aims to include but not limited to these memories and any other suitable types of memories.

The foregoing processor 704 may be a general-purpose processor, including a central processing unit (central processing unit, CPU), a network processor (network processor, NP), and the like; and may further be a digital signal processor (digital signal processor, DSP), an application specific integrated circuit (application specific integrated circuit, ASIC), a field-programmable gate array (field-programmable gate array, FPGA), or other programmable logic devices. The processor 704 is configured to implement the functions of the display device in the foregoing embodiments by invoking program code in the memory 703.

The transceiver 705 is configured to send and receive data in wireless communication. A component configured to implement a receiving function in the transceiver 705 may be regarded as a receiver, and a component configured to implement a sending function in the transceiver 705 may be regarded as a sender. That is, the transceiver 705 includes a receiver and a sender. The transceiver 705 may also be referred to as a transceiver machine or a transceiver circuit. The receiver may also be referred to as a receiving machine or a receiving circuit sometimes. The sender may also be referred to as a transmitting machine or a transmitting circuit sometimes.

The data interface 706 is connected to the mobile phone in a wired manner.

The structural diagram provided in this embodiment only shows a simplified design of the display device 20. In an actual application, the display device 20 may include any quantity of input apparatuses 701, display apparatuses 702, memories 703, processors 704, transceivers 705, and data interfaces 706, to implement the functions or operations performed by the display device 20 in the apparatus embodiments of this application, and all apparatuses that can implement this application fall within the protection scope of this application. Although not shown in the figure, the display device 20 may further include a power supply, and the like. The power supply is configured to supply power to various components, and may be logically connected to the processor 704 by using a power management system, thereby implementing functions such as charging, discharging, and power consumption management by using the power management system.

Figure 8:
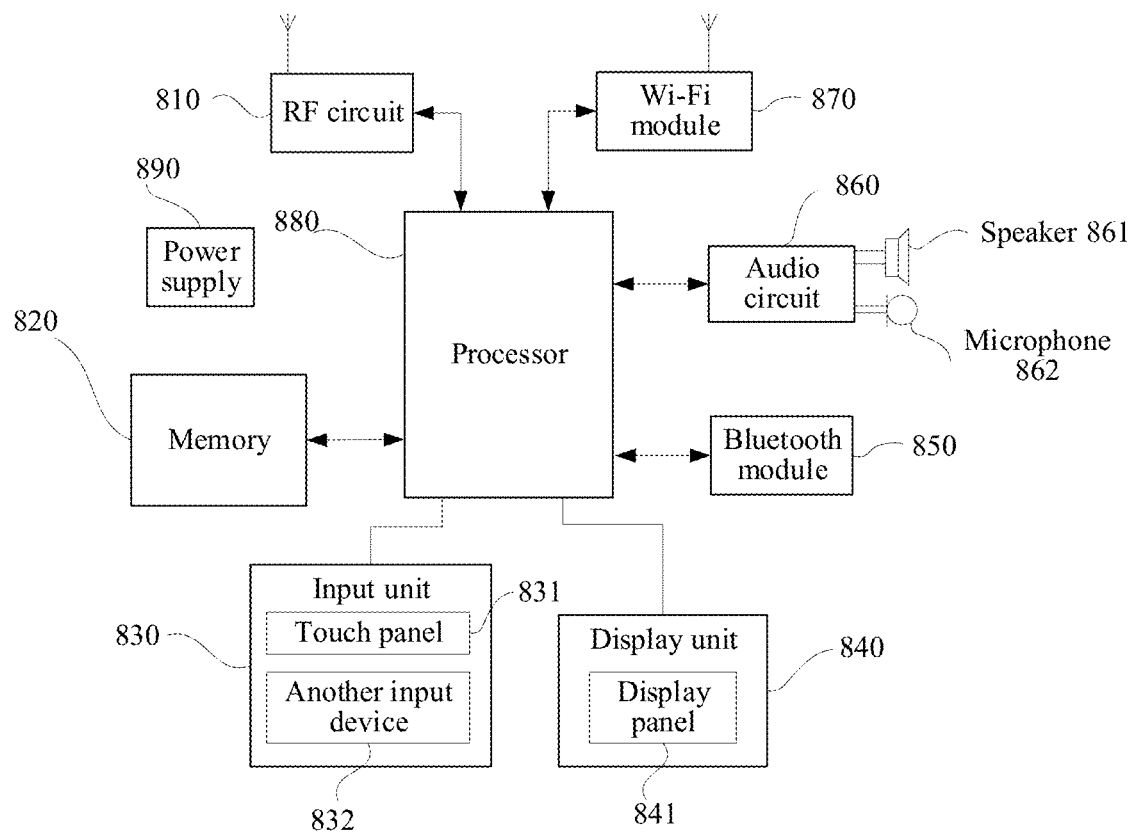
FIG. 8 is another schematic structural diagram of a mobile phone according to this application.

Referring to FIG. 8, another embodiment of a mobile phone provided in this application includes:

components such as a radio frequency (radio frequency, RF) circuit 810, a memory 820, an input unit 830, a display unit 840, a Bluetooth module 850, an audio circuit 860, a WiFi module 870, a processor 880, and a power supply 890. A person skilled in the art may understand that the structure of the mobile phone shown in FIG. 8 does not constitute a limitation on the mobile phone, and the mobile phone may include more components or fewer components than those shown in the figure, or some components may be combined, or a different component deployment may be used.

The following makes a detailed description of the components of the mobile phone with reference to FIG. 8:

The RF circuit 810 may be configured to send and receive signals during an information receiving and sending process or a call process. Specifically, the RF circuit receives downlink information from a base station, then delivers the downlink information to the processor 880 for processing, and sends designed uplink data to the base station. Generally, the RF circuit 810 includes but is not limited to an antenna, at least one amplifier, a transceiver, a coupler, a low noise amplifier (low noise amplifier, LNA), a duplexer, and the like. In addition, the RF circuit 810 may also communicate with a network and another device through wireless communication. The wireless communication may use any communication standard or protocol, including, but not limited to, Global System for Mobile Communications (Global System for Mobile communications, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), email, Short Messaging Service (Short Messaging Service, SMS), and the like.

The memory 820 may be configured to store a software program and a module. The processor 880 runs the software program and the module that are stored in the memory 820, to implement various functional applications and data processing of the mobile phone. The memory 820 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 820 may include a high speed RAM, and may further include a non-volatile memory, such as at least one magnetic disk storage device, a flash memory, or another volatile solid storage device.

The input unit 830 may be configured to receive inputted digit or character information, and generate a keyboard signal input related to the user setting and function control of the mobile phone. Specifically, the input unit 830 may include a touch panel 831 and another input device 832. The touch panel 831, which may also be referred to as a touch screen, may collect a touch operation of a user on or near the touch panel 831 (such as an operation of a user on or near the touch panel 831 by using any suitable object or accessory such as a finger or a stylus), and drive a corresponding connection apparatus according to a preset program. Optionally, the touch panel 831 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and transmits the touch point coordinates to the processor 880. In addition, the touch controller can receive a command transmitted by the processor 880 and execute the command. In addition, the touch panel 831 may be implemented by using various types, such as a resistive type, a capacitive type, an infrared type, and a surface acoustic wave type. In addition to the touch panel 831, the input unit 830 may further include the another input device 832. Specifically, the another input device 832 may include, but not limited to, one or more of a functional key (such as a volume control key or a switch key), a track ball, and a joystick.

The display unit 840 may be configured to display information inputted by the user or information provided for the user, and various menus of the mobile phone. The display unit 840 may include a display panel 841. Optionally, the display panel 841 may be configured by using a liquid crystal display (liquid crystal display, LCD), an organic light-emitting diode (organic light-emitting diode, OLED), or the like. Further, the touch panel 831 may cover the display panel 841. After detecting a touch operation on or near the touch panel, the touch panel 831 transfers the touch operation to the processor 880, to determine a type of a touch event. Then, the processor 880 provides a corresponding visual output on the display panel 841 according to the type of the touch event. Although in FIG. 8, the touch panel 831 and the display panel 841 are used as two separate parts to implement input and output functions of the mobile phone, in some embodiments, the touch panel 831 and the display panel 841 may be integrated to implement the input and output functions of the mobile phone.

The mobile phone may further include a Bluetooth module 850.

The audio circuit 860, a speaker 861, and a microphone 862 may provide audio interfaces between the user and the mobile phone. The audio circuit 860 may convert received audio data into an electrical signal and transmit the electrical signal to the speaker 861. The speaker 861 converts the electrical signal into a sound signal for output. On the other hand, the microphone 862 converts a collected sound signal into an electrical signal. The audio circuit 860 receives the electrical signal and converts the electrical signal into audio data, and outputs the audio data to the processor 880 for processing. Then, the processor sends the audio data to, for example, another mobile phone by using the RF circuit 810, or outputs the audio data to the memory 820 for further processing.

WiFi is a short distance wireless transmission technology. The mobile phone may help, by using the WiFi module 870, a user to send and receive an email, browse a web page, access stream media, and the like. This provides wireless broadband Internet access for the user. Although FIG. 8 shows the WiFi module 870, it may be understood that the WiFi module is not a necessary component of the mobile phone, and the WiFi module may be omitted as required provided that the scope of the essence of the present invention is not changed.

The processor 880 is a control center of the mobile phone, and is connected to various parts of the entire mobile phone by using various interfaces and lines. By running or executing the software program and/or the module stored in the memory 820, and invoking data stored in the memory 820, the processor executes various functions of the mobile phone and performs data processing, thereby monitoring the entire mobile phone. Optionally, the processor 880 may include one or more processing units. For example, the processor 880 may integrate an application processor and a modem processor. The application processor mainly processes an operating system, a user interface, an application program, and the like. The modem processor mainly processes wireless communication. It may be understood that the modem processor may either not be integrated into the processor 880.

The mobile phone further includes the power supply 890 (such as a battery) for supplying power to the components. For example, the power supply may be logically connected to the processor 880 by using a power management system, thereby implementing functions such as charging, discharging, and power consumption management by using the power management system.

Although not shown in the figure, the mobile phone may further include a camera, a sensor, and the like. Details are not described herein again.

In the embodiments of the present invention, by invoking the program stored in the memory 820, the processor 880 included in the mobile phone may implement the functions of the mobile phone in the embodiment shown in FIG. 2 or other optional embodiments.

In this application, "multiple" means two or more, and another quantifier is similar to this. "And/or" represents that three relationships may exist. For example, A and/or B may represent the following three cases: only A exists, both A and B exist, and only B exists. It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

This application provides a computer storage medium, including instructions, the instructions, when run on a computing device, causing the computing device to perform the steps implemented by a display device in any embodiment above.

This application further provides a computer storage medium, including instructions, the instructions, when run on a computing device, causing the computing device to perform the steps implemented by a mobile phone in any embodiment above.

This application further provides a computer program product, the computer program product, when run on a computing device, causing the computing device to perform the steps implemented by a display device in any embodiment above.

This application further provides a computer program product, the computer program product, when run on a computing device, causing the computing device to perform the steps implemented by a mobile phone in any embodiment above.

All or some of the foregoing embodiments may be implemented by using software, hardware, firmware, or any combination thereof. When software is used for implementation, implementation may be entirely or partially performed in the form of a computer program product.

The computer program product includes one or more computer instructions. When the computer program instructions are loaded and executed on the display device or the mobile phone, the procedure or functions according to this application are all or partially generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, including one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

The foregoing embodiments are merely intended for describing the technical solutions of this application, but not for limiting this application. Although this application is described in detail with reference to the foregoing embodiments, a person of ordinary skill in the art should understand that modifications may be still made to the technical solutions recorded in the foregoing embodiments or equivalent replacements may be made to some technical features thereof, and these modifications or replacements do not cause the essence of the corresponding technical solutions to depart from the scope of the technical solutions of the embodiments of this application.

What is claimed is:

1. A control system, comprising:
a first electronic device and a second electronic device; wherein
the first electronic device displays a first screen content when the first electronic device is in the first navigation function, and the first navigation function is different from a three-key navigation function;
the second electronic device displays a screen projection window and a navigation bar after the first electronic device and the second electronic device establish connection, wherein the screen projection window comprises the first screen content, and the navigation bar comprises three virtual navigation keys;
the second electronic device receives a user operation acting on one of the virtual navigation keys;
the first electronic device displays a second screen content, after the first electronic device performs the navigation function corresponding to the one of the virtual navigation keys;
the second electronic device displays the second screen content in the screen projection window;
wherein the first electronic device returns to a desktop when the first electronic device receives an operation of sliding up from a lower left end of a screen of the first electronic device;
wherein the first electronic device enters a task menu when the first electronic device receives an operation of sliding up from the lower left end of the screen and holding for a period of time; and wherein the first electronic device returns to an upper level when the first electronic device receives an operation of sliding rightward from a leftmost side of the screen of the first electronic device.

2. The system according to claim 1, wherein the three virtual navigation keys include a menu key, a desktop key and a return key, wherein the menu key corresponds to a navigation function of entering the task menu, the desktop key corresponds to a navigation function of returning to the desktop, and the return key corresponds to a navigation function of returning to an upper level navigation.

3. The system according to claim 1, wherein the user operation comprises a single-click by mouse.

4. The system according to claim 1, wherein the navigation bar is outside the screen projection window.

5. The system according to claim 1, wherein the navigation bar is located below the screen projection window.

6. The system according to claim 1, wherein the first navigation function comprises a gesture navigation or an out-of-screen physical navigation.

7. The system according to claim 6, wherein the gesture navigation comprises:
  receiving, by the first electronic device, an operation of sliding up from a lower left end of the screen; or
  receiving, by the first electronic device, an operation of sliding upward from the lower left end of the screen and holding for a period of time; or
  receiving, by the first electronic device, an operation of sliding rightward from the leftmost side of the screen of the first electronic device.

8. The system according to claim 6, wherein the second electronic device simultaneously enables the three-key navigation and the gesture navigation.

9. The system according to claim 1, wherein the screen projection window and the navigation bar are located in a same collaborative window.

10. The system according to claim 1, wherein the collaboration window is located on the right side of a screen of the second electronic device.

11. The system according to claim 10, wherein the collaborative window comprises a title bar, and the title bar comprises at least a minimized window key, a maximized window key and a close window key.

12. The system according to claim 11, wherein the title bar is located above the screen projection window.

13. The system according to claim 10, wherein:
prior to displaying a screen projection window and a navigation bar, the second electronic device receives the first screen content and a first target navigation function identifier sent by the first electronic device, wherein the first navigation function identifier is the identifier of the first navigation function.

14. The system according to claim 1, wherein:
prior to displaying the second screen content,
the second electronic device generates a key instruction according to the user operation; and
the second electronic device sends the key instruction to the first electronic device, wherein the key instruction corresponds to a function of receiving the virtual navigation key operated by the keyboard and mouse.

15. The system according to claim 1, wherein:
prior to displaying the second screen content in the screen projection window, the second electronic device receives the second screen content sent by the first electronic device.

16. The system according to claim 1, wherein:
when the first electronic device is in the three-key navigation function, after the first electronic device and the second electronic device are connected, the second electronic device mirrors the first screen content on the screen projection window, wherein the navigation bar is hidden.

17. The system according to claim 13, wherein,
the second electronic device sends a navigation function modification instruction to the first electronic device according to the first navigation function identifier; and
the first electronic device changes the first navigation function to the three-key navigation function according to the navigation function modification instruction.

18. The system according to claim 17, wherein:
the first electronic device displays the navigation bar; and
the second electronic device displays the navigation bar, and the navigation bar is used to control the first electronic device on the second electronic device.

19. The system according to claim 1, wherein:
the first electronic device displaying the second screen content and the second electronic device displaying the second screen content are displayed synchronously.

* * * * *